United States Patent [19]

Rodal et al.

[11] Patent Number: 4,749,927
[45] Date of Patent: Jun. 7, 1988

[54] ADAPTIVE DIGITALLY CONTROLLED MOTOR DRIVE SYSTEM AND METHOD

[75] Inventors: David Rodal, Palo Alto; Nathan Osborn, Menlo Park; Robert Steele, Palo Alto, all of Calif.

[73] Assignee: Ampex Corporation, Redwood City, Calif.

[21] Appl. No.: 851,007

[22] Filed: Apr. 11, 1986

[51] Int. Cl.⁴ .............................................. G05B 1/01
[52] U.S. Cl. ..................................... 318/599; 318/341; 318/327; 318/329; 318/439
[58] Field of Search ...................... 318/599–608, 318/616, 617, 618, 300, 314, 316, 317, 318, 322, 326, 327, 328, 331, 332, 338, 339, 341, 345, 359, 430, 432, 433, 434, 438, 439, 254, 138, 271; 364/474, 475

[56] References Cited

U.S. PATENT DOCUMENTS

| | | | |
|---|---|---|---|
| 3,739,158 | 6/1973 | Woodward | 318/599 X |
| 3,983,464 | 9/1976 | Peterson | 318/327 |
| 4,028,601 | 6/1977 | Peterson | 318/271 |
| 4,119,897 | 10/1978 | Skoog | 318/317 X |
| 4,138,632 | 2/1979 | Pauwels et al. | 318/599 |
| 4,146,922 | 3/1979 | Brown et al. | 318/603 X |
| 4,152,632 | 5/1979 | Peterson | 318/317 |
| 4,471,281 | 9/1984 | Uezumi et al. | 318/606 |
| 4,476,417 | 10/1984 | Zimmermann | 318/317 X |
| 4,489,258 | 12/1984 | Kahlen et al. | 318/317 |
| 4,490,796 | 12/1984 | Bigbie et al. | 364/519 |
| 4,513,231 | 4/1985 | Kuno et al. | 318/341 |
| 4,523,134 | 6/1985 | Kinoshita et al. | 318/341 X |
| 4,544,868 | 10/1985 | Murty | 318/439 X |
| 4,556,830 | 12/1985 | Schwalm et al. | 318/329 X |
| 4,578,626 | 3/1986 | Richter | 318/317 X |
| 4,623,827 | 11/1986 | Ito | 318/341 |
| 4,673,851 | 6/1987 | Disser | 318/599 X |

Primary Examiner—William M. Shoop, Jr.
Assistant Examiner—Paul Ip
Attorney, Agent, or Firm—Elizabeth E. Strnad; Richard P. Lange

[57] ABSTRACT

A digitally controlled motor drive system using a pulse width modulated motor drive receives a desired motor velocity signal and an actual motor velocity signal and it provides a corresponding velocity error signal. The velocity error signal is adjusted in response to a change in the value of a power voltage supplied to the motor. The velocity error signal may be compensated for back electromotive force and/or for static friction in the motor, if desired. The system is simple, reliable and cost effective.

14 Claims, 3 Drawing Sheets

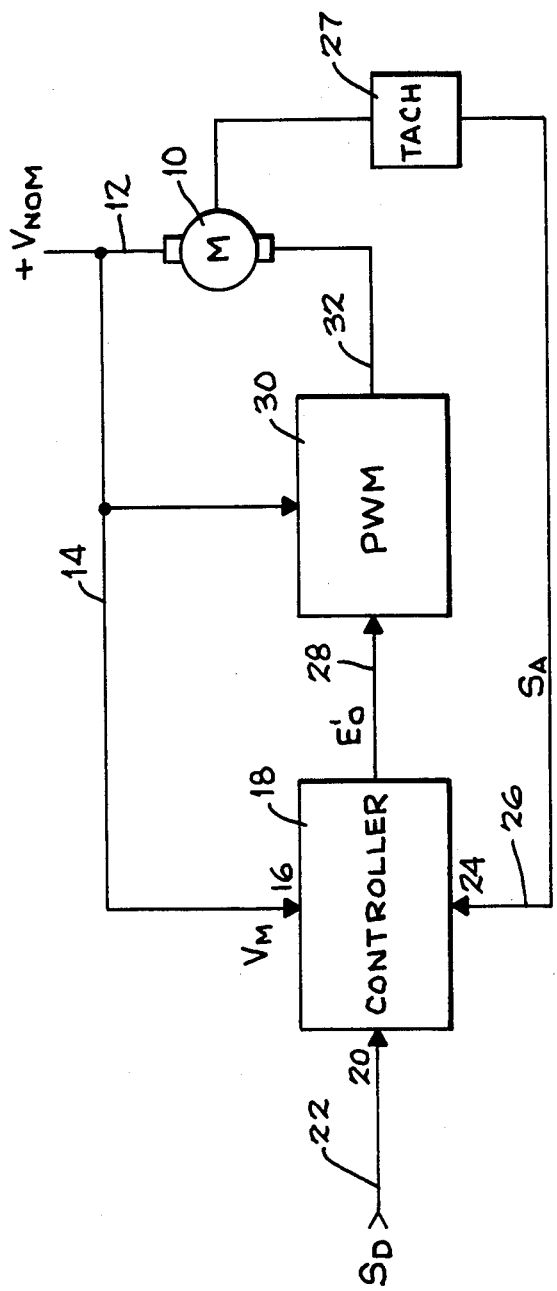
FIG_1

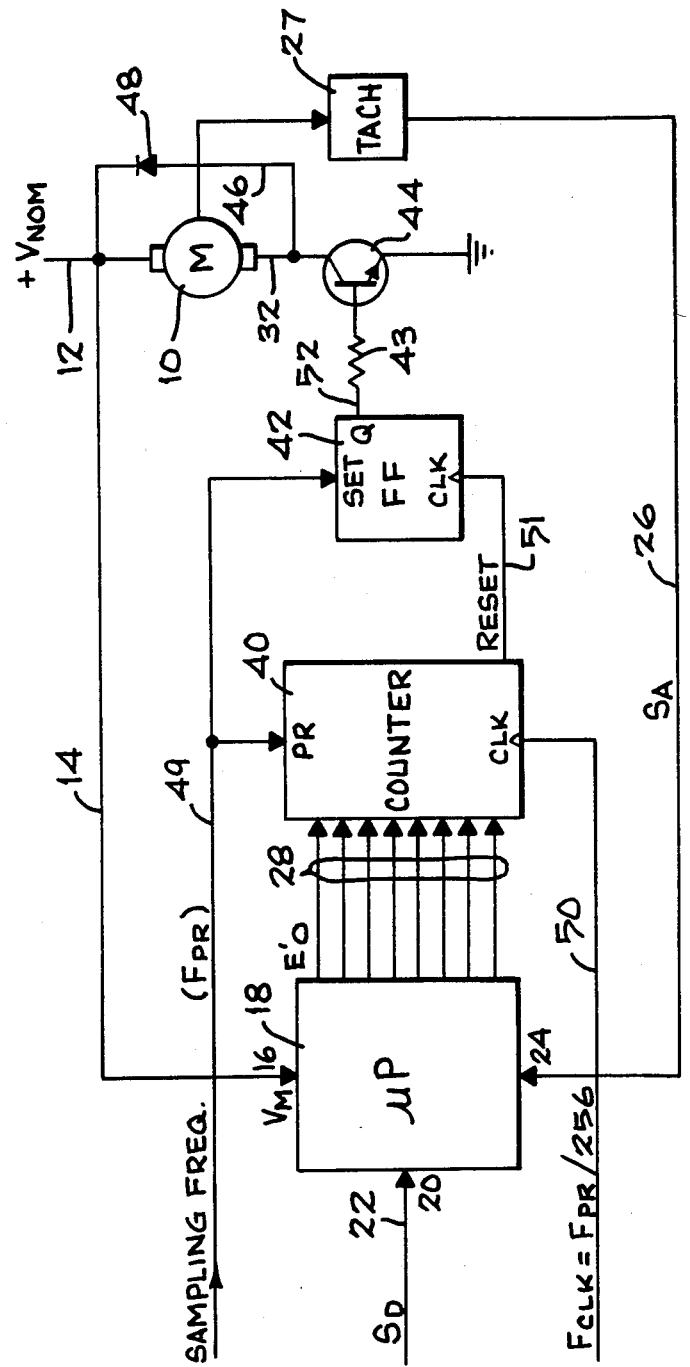
FIG_2

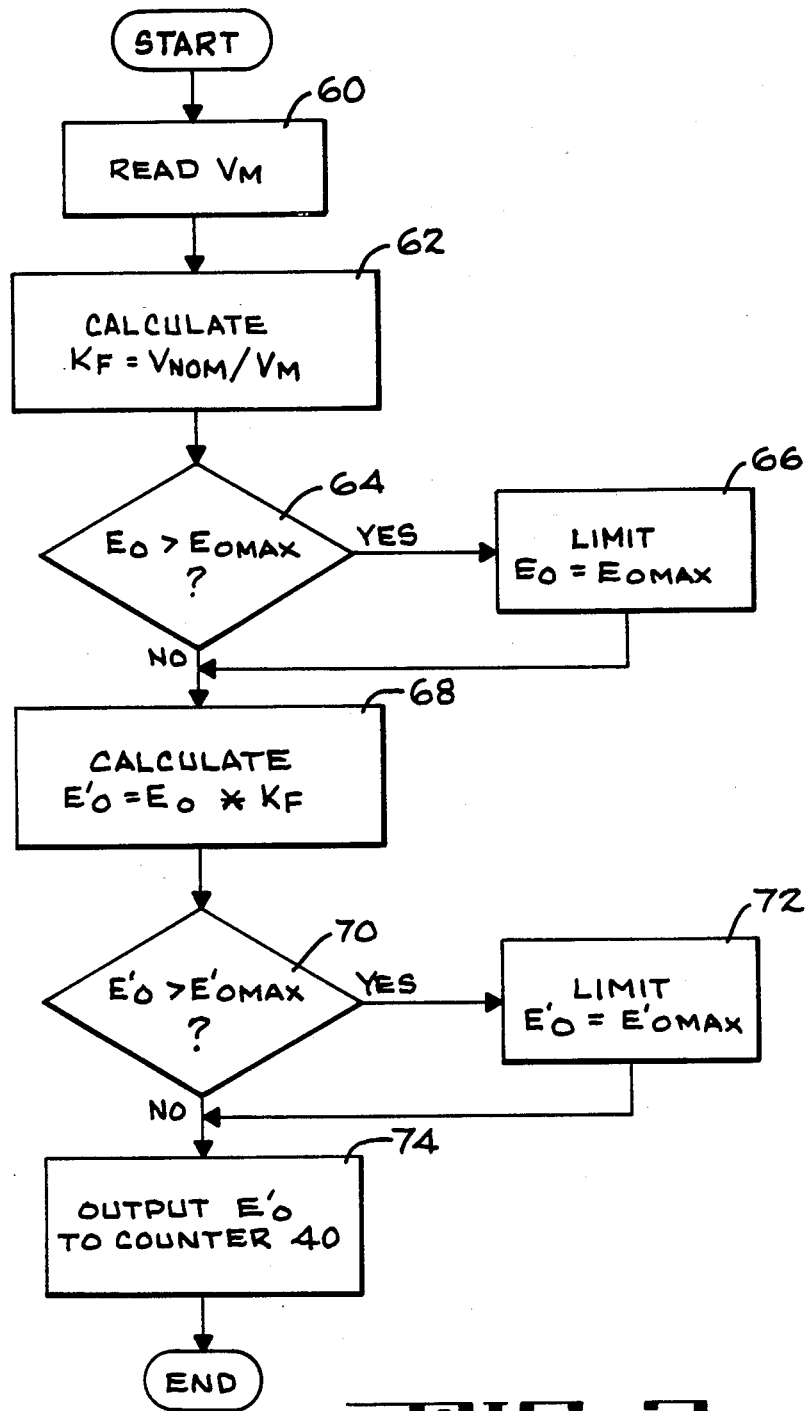
FIG_3

ADAPTIVE DIGITALLY CONTROLLED MOTOR DRIVE SYSTEM AND METHOD

The invention relates to a digitally controlled motor drive system and method, and more particularly to such systems utilizing a pulse width modulated motor drive.

Prior art analog motor drive systems are known to utilize feedback servo loops for sensing the actual motor velocity and adjusting the current supplied to the motor to obtain a desired velocity. One type of these servo loops generally utilizes a motor drive amplifier including an error signal amplifier and a pulse width modulator (PWM). The error signal amplifier receives an error signal which is determined as a difference signal between the desired and actual motor velocity and applies an amplified error signal to the pulse width modulator. The pulse width modulator generates output pulses of a variable width proportional to the magnitude of the amplified error signal. When the magnitude of the power voltage supplied to the motor changes, it causes a change in the servo loop gain. To assure a corresponding change in the feedback signal magnitude, the error signal amplifier must have a relatively high gain. The foregoing requirements contribute to the complexity of the known motor drive systems. Consequently, these known systems are expensive to manufacture and have reduced reliability.

In addition, when substantial changes occur in motor resistance, back electromotive force (EMF) or power supply voltage, components of the known system often have to be replaced to accommodate the changes.

The present invention overcomes the above-indicated disadvantages of the known analog motor drive systems as it is summarized below. The motor drive system of the invention utilizes a digitally controlled servo having an open loop portion and a closed loop portion of the motor control. The open loop detects an actual amplitude of the power voltage supplied to the motor. The closed loop detects the actual velocity of the motor. A digital motor drive controller receives a first input signal indicating a desired velocity of the motor. The controller also receives a second and a third input signal from the open loop and closed loop, respectively. The controller generates an error signal which is determined from a difference between a desired and actual motor velocity. The controller adjusts the error signal to compensate for any changes in the power supply voltage from a nominal value thereof.

The controller may also adjust the error signal to compensate for back EMF by estimating its value from the actual motor velocity.

In addition, the controller may adjust the error signal to compensate for mechanical friction in the motor which value generally changes for different motors.

In the preferred embodiment of the invention the controller is implemented by a microprocessor which is programmed to calculate the adjusted error signal from its respective input signal values. The power supply voltage is sampled at a constant frequency, for example at 60 samples per second. The obtained samples are compared with a nominal voltage value and a correction factor is calculated accordingly. The microprocessor applies the adjusted error signal to a digital pulse width modulator which in turn applies controlled width pulses to drive the motor.

It is seen from the foregoing description that the system of the invention eliminates the complex motor drive amplifier design of prior art motor drive systems. At the same time it compensates for power supply voltage changes thereby adapting the circuit to these changes. It also compensates for back EMF and mechanical friction in the motor. The system of the invention is thus simplified, reliable and cost effective.

BRIEF DESCRIPTION OF THE DRAWINGS

FIG. 1 is a simplified block diagram illustrating the preferred embodiment of the invention.

FIG. 2 is a more detailed block diagram of a preferred embodiment of the invention.

FIG. 3 is a flow chart illustrating the operation of the open loop portion of the preferred embodiment.

DETAILED DESCRIPTION

The invention will now be described with reference to the block diagram of FIG. 1, followed by the description of the diagram of FIG. 2. To facilitate comparison corresponding elements in the figures will be designated by like reference numerals.

In FIG. 1 a D.C. motor 10 receives via line 12 a D.C. supply voltage having a nominal value $V_{NOM}$ from a power supply voltage source (not shown). That voltage value is applied via line 14 to an input 16 of a controller 18. The voltage on line 14 represents an actual or measured voltage value $V_M$, which may differ from the nominal voltage $V_{NOM}$, as it will be described below.

The controller 18 also receives at an input 20 a desired motor velocity value $S_D$ via line 22. At a further input 24 the controller 18 receives via line 26 an actual or measured motor velocity value $S_A$ which may be determined for example from the number of motor rotations per minute (RPM) utilizing a tachometer as shown at 27 or by other well known means.

From the above-described input signals $S_D$, $S_A$, and $V_M$ the controller 18 determines a velocity error voltage value $E_O$ as being proportional to a difference between the desired and actual motor velocity corresponding to a desired torque that is, $E_O = (S_D - S_A)$. In accordance with a particular feature of the invention the actual power supply voltage is measured and a correction factor $K_F$ is calculated as a ratio of a nominal and an actual power supply voltage value $K_F = V_{NOM}/V_M$. The error voltage $E_O$ is multiplied by the correction factor to obtain an adjusted error signal $E'_O = E_O K_F$. In a basic form of the invention the thusly adjusted error signal $E_O'$ is applied to a motor drive signal generator 30, preferably implemented by a pulse width modulator which in turn applies corresponding drive pulses to the motor.

In a more advanced form of the invention an estimated back EMF value is calculated by the controller 18 as being proportional to the received actual motor velocity value. The thusly estimated back EMF value is added to the error signal and the sum of these signals is adjusted by the correction factor prior to being applied to the pulse width modulator 30.

In a still more advanced form of the invention an offset signal value compensating for static friction in the motor is added to the above sum by the controller 18, prior to being adjusted by the correction factor. The resulting thusly compensated error signal value is then adjusted by the correction factor, prior to being applied to the pulse width modulator 30.

The pulse width modulator 30 generates pulses of a variable width which are applied via line 32 as a drive signal to switch on and off the power voltage on line 12 applied to the windings of the D.C. motor 10 in a known manner.

It is seen from the foregoing description that the motor drive circuit of the invention is greatly simplified when comparing to prior art circuits. The digitally controlled motor drive of the invention automatically adapts the circuit operation to changes in the power supply voltage to obtain a desired motor velocity.

Now the preferred embodiment of the invention will be described with reference to FIGS. 2 and 3. As it is seen from FIG. 2, the controller 18 of FIG. 1 is preferably implemented by a microprocessor, for example type 68000 manufactured by Motorola Corporation. The pulse width modulator 30 of FIG. 1 preferably comprises a presettable counter 40, a D flip-flop 42, a series resistor 43 and a switching power transistor 44. The counter 40, for example implemented by a commercially available presettable down counter receives a preset signal via line 49 which is also utilized as a set signal for flip-flop 42. The counter 40 receives a clock signal via line 50. A reset signal is applied from counter 40 via line 51 to the clock input of the flip-flop 42. The output signal from the Q-output of the flip-flop 42 is applied via line 52 and a series resistor 43 to the base of a power transistor 44. The emitter of the power transistor 44 is grounded. Its collector is connected via line 32 to one terminal of the motor winding having its second, opposite terminal connected via line 12 to the power voltage supply as previously described. A diode 48 is coupled via line 16 in parallel with the motor winding.

In a basic form of the invention the microprocessor 18 is programmed to calculate an adjusted error voltage $E_O'$ as it is described by the following equation:

$$E_O' = E_O K_F = K_1(S_D - S_A)(V_{NOM}/V_M) \quad (1)$$

where $K_1$ is a constant corresponding to a servo performance factor selected to obtain a desired servo bandwidth as well known in the art;

$S_D$ is a desired motor velocity applied to input 20;

$S_A$ is an actual motor velocity applied to input 24;

$V_{NOM}$ is a nominal value of the power supply voltage; and $V_M$ is an actual measured value of the power supply voltage.

It is seen from equation (1) that the adjusted error voltage $E_O'$ is proportional to the product of the velocity error voltage $E_O K_1(S_D - S_A)$ and the previously described correction factor $K_F = V_{NOM}/V_M$.

The value $E_O'$ calculated in accordance with equation (1) is applied to the output lines 28 from the microprocessor 18 as an 8-bit parallel digital word. The value of the digital signal on line 28 is proportional to a pulse width provided by the pulse width modulator 30, as it will be described later. The resulting average voltage supplied to the motor 10 on line 32 is proportional to the pulse width multiplied by the value $V_M$.

In a more advanced form of the invention the microprocessor is programmed to calculate an adjuster error voltage $E_O'$ as follows:

$$E_O' = (E_O + K_2 S_A) K_F = [K_1(S_D - S_A) + K_2 S_A](V_{NOM}/V_M) \quad (2)$$

where $K_2$ is a well known back EMF constant which varies for different motors. As well known, the back EMF is directly proportional to the actual motor velocity. $K_2 S_A$ thus represents an approximated value compensating for the back EMF value.

In a still more advanced form of the invention the microprocessor is programmed to further compensate the error voltage defined by equation (2) for static friction in the motor and/or dead band in the pulse width modulator. This static friction which generally changes from motor to motor is obtained as follows. The power supply voltage on line 12 to the motor is turned off and the motor is stopped. Then the value of $E_O'$ on lines 28 is slowly increased and in the instant when the motor is starting to move the value $E_O'$ is detected. That detected value is proportional to a minimum voltage value which is necessary to overcome the static friction in the motor.

In this instance the adjusted error voltage value is calculated by the microprocessor 18 as follows:

$$E_O' = [K_1(S_D - S_A) + K_2 S_A + K_3 S_F](V_{NOM}/V_M) \quad (3)$$

where $K_3 S_F$ is equal to $E_O'$ at $V_M = V_{NOM}$.

It follows from the foregoing description that the microprocessor calculates the adjusted error voltage $E_O'$ in accordance with one of the equations (1) to (3). The flow chart of FIG. 3 shows the steps utilized to determine the values $E_O'$ in accordance with equation (1) as follows.

As indicated by block 60 of FIG. 3, the microprocessor 18 reads the measured voltage value $V_M$ applied on line 14. As shown in block 62, it calculates the correction factor $K_F$ as a ratio of the nominal voltage $V_{NOM}$ to the measured voltage value $V_M$. Block 64 determines whether a previously calculated velocity error voltage value $E_O$ is greater than a predetermined maximum value $E_{OMAX}$ which is set for example to limit the maximum voltage supplied to the motor. If $E_O$ is greater than $E_{OMAX}$ than $E_O$ is limited to $E_{OMAX}$ is block 66. As shown in block 68 the adjusted error voltage value $E_O'$ is calculated by multiplying the value $E_O$ by $K_F$. Box 70 determines whether $E_O'$ calculated in box 68 is greater than a predetermined maximum value thereof. That maximum value is set for example to prevent an overflow of the counter 40 as it will follow from further description. If $E_O'$ is greater than $E'_{OMAX}$, then $E_O'$ is limited to the value of $E'_{OMAX}$ in block 72. The thusly determined value $E_O'$ is provided as an output signal on lines 28 of FIG. 2 from the microprocessor 28, as it is indicated by block 74 in FIG. 3.

In case the adjusted error voltage value $E_O'$ is determined from the equation (2), the flow chart of FIG. 2 may be utilized as above described with the exception that the value $E_O$ in blocks 64 and 68 is replaced by a value $(E_O + K_2 S_A)$. This latter value corresponds to the velocity error voltage compensated for the back EMF value, as previously described.

Analogously, the flow chart of FIG. 3 may be used also for determining the value $E_O'$ from equation (3). In that case the $E_O$ in blocks 64 and 68 will be replaced by the value $(E_O + K_2 S_A + K_3 S_F)$, which value corresponds to the velocity error voltage compensated for both the back EMF and static friction in the motor, as previously described.

It will be understood that the other calculations indicated in equations (1) to (3) include subtraction of input the signals $(S_D - S_A)$, multiplication by various coefficients and addition of thusly obtained partial values. Because of the similarity of flow charts depicting operation in accordance with equations (2) or (3) to the previously described flow chart of FIG. 3, additional flow charts are not shown.

The adjusted error voltage $E_O'$ from the microprocessor 18 is applied as an 8-bit parallel number on lines 28 to the down counter 40. The counter is present to the number on line 28 by a preset signal via line 49, which preset signal also sets the flip-flop 42. In the preferred embodiment the frequency of the present signal is selected $F_{PR}=16$ KHZ. A clock signal on line 50 is applied to the counter 40. The clock signal has a substantially higher frequency $F_{CLK}$ than the frequency of the preset signal to obtain a desired high resolution from the pulse width modulator as it will follow from further description. In the preferred embodiment $F_{CLK}=F_{PR}/256$. After presetting the counter 40 to the number on line 28, it counts down at the clock signal frequency $F_{CLK}$. When the count reaches zero, the flip-flop 42 is reset via line 51. Thus the output signal from the Q output of D flip-flop 42 on line 52 is set high at the time of occurrence of the preset signal on line 49 and remains high until the counter 40 reaches zero and the flip-flop 42 is reset. The thusly obtained pulses on line 52 have a width proportional to the signal $E_O'$ on line 28 and a frequency equal to $F_{PR}$. The signal on line 52 is a drive signal applied to the motor 10, as it will be described below.

The drive signal on line 52 controls via the series resistor 43 the on/off switching time of the power transistor 44. Thus when the drive signal is high, the switching transistor 44 is on and the power voltage is supplied via line 12 to the motor winding. When the signal on line 52 is low, the transistor 44 is off and the power voltage is not applied. To maintain a low inductance of the motor winding in both on and off states, a power diode 48 is connected to the voltage source in parallel with the motor winding to provide a path for inductive current when the transistor 44 is turned off.

While the preferred embodiment has been described with reference to a direct current motor, the invention may also be utilized to drive A.C. motors having a different type of motor drive signal generating circuit.

What is claimed is:

1. A digitally controlled motor drive system, comprising;
   a motor coupled to a power supply voltage source to receive a power supply voltage having a nominal value;
   means coupled to said motor for providing an output signal corresponding to an actual velocity thereof;
   a digital controller coupled to receive an externally applied first input signal corresponding to a desired motor velocity, a second input signal corresponding to said actual motor velocity, and a third input signal corresponding to an actual value of said power supply voltage, said digital controller providing an error signal derived from a difference between said first and second input signals thereof, said digital controller being further coupled to provide a correction factor proportional to a change in said third input signal with respect to said nominal value thereof; and to multiply said error signal by said correction factor to obtain an adjusted error signal and
   means for generating a motor drive signal coupled to receive said adjusted error signal and to apply responsively a drive signal to said motor.

2. The motor drive system of claim 1 wherein said digital controller is further coupled to provide a compensation signal proportional to said actual motor velocity and substantially equal to a back electromotive force of said motor, and to compensate said error signal by said compensation signal for said back electromotive force.

3. The motor drive system of claim 1 wherein said motor has a known static friction value and said digital controller is further coupled to provide an offset signal substantially equal to said static friction value and to compensate said error signal by said offset signal, thereby compensating for said static friction value.

4. The motor drive system of claim 1 wherein said digital controller is a microprocessor coupled to provide said error signal as proportional to a difference between said first and second input signals thereof, and said correction factor as proportional to a ratio of said nominal supply voltage value and said actual supply voltage value.

5. The motor drive system of claim 1 wherein said digital controller is a microprocessor coupled to provide said error signal as proportional to a difference between said first and second input signals thereof, a fourth signal value proportional to said actual motor velocity and substantially equal to a back electromotive force of said motor, and to multiply a sum of said error signal value and said fourth signal value by said correction factor to obtain said adjusted error signal.

6. The motor drive system of claim 1 wherein said digital controller is a microprocessor coupled to provide said error signal as proportional to a difference between said first and second input signals thereof, a fourth signal value proportional to said actual motor velocity and substantially equal to a back electromotive force of said motor, a fifth signal value proportional to a minimum voltage value necessary to overcome a static friction of said motor, and to multiply a sum of said error signal value, said fourth signal value and said fifth signal value by said correction factor to obtain said adjusted error signal.

7. The motor drive system of claim 1 wherein said means for generating a motor drive signal is a pulse width modulator means.

8. The motor drive system of claim 7 wherein said pulse width modulator means comprises a presettable counter means having an input coupled to an output of said microprocessor for receiving said adjusted error signal, and having a preset input coupled to receive a preset signal of a selected frequency, a flip-flop having a set input coupled to receive said preset signal and a reset input coupled to receive a reset signal from said counter means, said flip-flop coupled to provide drive pulses having a width corresponding to said adjusted error signal and a frequency corresponding to that of said preset signal, and wehrein said pulse width modulator means further comprises a power switch means coupled to switch said power supply voltage to said motor in response to said drive pulses.

9. A digitally controlled motor drive system, comprising;
   a motor coupled to a power supply voltage source to receive a power supply voltage having a nominal value;
   means coupled to said motor for providing an output signal corresponding to an actual velocity thereof;
   microprocessor means coupled to receive an externally applied first input signal corresponding to a desired motor velocity, a second input signal corresponding to said actual motor velocity, and a third input signal corresponding to an actual value of said power supply voltage, said microprocessor means coupled to provide an error signal proportional to a difference between said first and second input signals, a correction factor proportional to a ratio of said nominal power supply voltage value and said actual power supply voltage value and to multiply said error signal by said correction factor to obtain an adjusted error signal; and means for generating a motor drive signal coupled to receive said adjusted error signal and to apply responsively a drive signal to said motor.

10. A digitially controlled motor drive system, comprising;

a motor coupled to a power supply voltage source to receive a power supply voltage having a nominal value;

means coupled to said motor for providing an output signal corresponding to an actual velocity thereof;

microprocessor means coupled to receive an externally applied first input signal corresponding to a desired motor velocity, a second input signal corresponding to said actual motor velocity, and a third input signal corresponding to an actual value of said power supply voltage, said microprocessor means coupled to provide an error signal proportional to a difference between said first and second input signals, a fourth signal value proportional to said actual motor velocity and substantially equal to a back electromotive force of said motor, a correction factor proportional to a ratio of said nominal power supply voltage value and an actual value of said power supply voltage, and to multiply a sum of said error signal and said fourth signal values by said correction factor to obtain said adjusted error signal; and means for generating a motor drive signal coupled to receive said adjusted error signal and to apply responsively a drive signal to said motor.

11. A digitially controlled motor drive system, comprising:

a motor coupled to a power supply voltage source to receive a power supply voltage having a nominal value;

means coupled to said motor for providing an output signal corresponding to an actual velocity thereof;

microprocessor means coupled to receive an externally applied first input signal corresponding to a desired motor velocity, a second input signal corresponding to said actual motor velocity, and a third input signal corresponding to an actual value of said power supply voltage, said microprocessor means coupled to provide an error signal proportional to a difference between said first and second input signals, a fourth signal value proportional to said actual motor velocity and substantially equal to a back electromotive force of said motor, a fifth signal value proportional to a minimum voltage value necessary to overcome a static friction of said motor, a correction factor proportional to a ratio of said nominal power supply voltage value and said actual power supply voltage value, and to multiply a sum of said error signal, said fourth and fifth signal values by said correction factor to obtain said adjusted error signal; and means for generating a motor drive signal coupled to receive said adjusted error signal and to apply responsively a drive signal to said motor.

12. A digitally controlled motor drive system, comprising;

a motor coupled to a power supply voltage source to receive a power supply voltage having a nominal value;

means coupled to said motor for providing an output signal corresponding to an actual velocity thereof;

a digital controller coupled to receive an externally applied first input signal corresponding to a desired motor velocity, a second input signal corresponding to said actual motor velocity, and a third input signal corresponding to an actual value of said power supply voltage, said digital controller providing an error signal derived from a difference between said first and second input signals thereof, said digital controller being coupled to adjust said error signal in response to a change in said third input signal with respect to said nominal value thereof; and pulse width modulator means comprising a presettable counter means having an input coupled to an output of said digital controller for receiving said adjusted error signal, and having a preset input coupled to receive a preset signal of a selected frequency, a flip-flop having a set input coupled to receive said preset signal and a reset input coupled to receive a reset signal from said counter means, said flip-flop coupled to provide drive pulses having a width corresponding to said adjusted error signal and a frequency corresponding to that of said preset signal, and a power switch means coupled to switch said power supply voltage to said motor in response to said drive pulses.

13. A method of providing drive signals to a motor, comprising the steps of:

applying a power supply voltage to said motor;

detecting an actual value of said voltage applied to said motor;

detecting an actual velocity of said motor;

providing an error signal proportional to a difference between a desired motor velocity and said detected actual motor velocity;

providing a compensation signal proportional to said actual motor velocity and substantially equal to a back electromotive force of said motor;

providing a correction factor proportional to a ratio of a nominal power supply voltage value to said actual voltage value;

multiplying a sum of said error signal value and said compensation signal value by said correction factor to obtain an adjusted error signal; and generating a motor drive signal in response to said adjusted error signal.

14. A method of providing drive signals to a motor, comprising the steps of:

applying a power supply voltage to said motor;

detecting an actual value of said voltage applied to said motor;

detecting an actual velocity of said motor;

providing an error signal proportional to a difference between a desired motor velocity and said detected actual motor velocity;

providing a compensation signal proportional to said actual motor velocity and substantially equal to a back electromotive force of said motor;

providing an offset signal proportional to a minimum voltage value necessary to overcome a static friction of said motor;

providing a correction factor proportional to a raio of a nominal power supply voltage value to said actual voltage value;

multiplying a sum of said error signal value, said compensation signal value and said offset signal value by said correction factor to obtain an adjusted error signal; and generating a motor drive signal in response to said adjusted error signal.

* * * * *